(12) United States Patent
Park et al.

(10) Patent No.: US 9,584,433 B2
(45) Date of Patent: Feb. 28, 2017

(54) DATA TRANSMISSION METHOD AND APPARATUS

(71) Applicant: Electronics and Telecommunications Research Institute, Daejeon (KR)

(72) Inventors: Jae Woo Park, Daejeon (KR); Jee Yon Choi, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 132 days.

(21) Appl. No.: 14/521,280

(22) Filed: Oct. 22, 2014

(65) Prior Publication Data

US 2015/0117427 A1   Apr. 30, 2015

(30) Foreign Application Priority Data

Oct. 30, 2013   (KR) ........................ 10-2013-0130459

(51) Int. Cl.
| | |
|---|---|
| *H04L 12/863* | (2013.01) |
| *H04W 28/02* | (2009.01) |
| *H04W 72/00* | (2009.01) |
| *H04W 72/12* | (2009.01) |
| *H04W 74/00* | (2009.01) |
| *H04W 84/12* | (2009.01) |

(52) U.S. Cl.
CPC ....... *H04L 47/628* (2013.01); *H04W 28/0263* (2013.01); *H04W 72/00* (2013.01); *H04W 72/12* (2013.01); *H04W 74/00* (2013.01); *H04W 84/12* (2013.01)

(58) Field of Classification Search
CPC   H04L 47/628; H04W 28/0263; H04W 72/00; H04W 72/12; H04W 74/00; H04W 74/0816; H04W 84/12
See application file for complete search history.

(56) References Cited

U.S. PATENT DOCUMENTS

| | | | |
|---|---|---|---|
| 7,502,358 B1 * | 3/2009 | Kopikare | H04W 74/06 370/346 |
| 8,249,105 B2 | 8/2012 | Joshi et al. | |
| 2006/0062189 A1 * | 3/2006 | Takeuchi | H04W 74/0875 370/338 |
| 2006/0280194 A1 * | 12/2006 | Jang | H04L 47/2441 370/412 |

(Continued)

*Primary Examiner* — Christopher Grey (57) ABSTRACT

Provided is a data transmission apparatus including a queue management unit to manage at least one queue in which information associated with at least one buffer descriptor (BD) is stored, a scheduler to estimate information to be transmitted among information associated with at least one media access control (MAC) protocol data unit (MPDU) using at least one transmission bitmap (Tx bitmap), a data transmitter to read the estimated information from information associated with a BD indicated in the at least one Tx bitmap, and transmit the read information to a physical layer, and a physical layer management unit to generate information associated with a presentation protocol data unit (PPDU) based on the transmitted information, and transmit the generated information over the air, wherein the at least one BD includes information associated with the at least one MPDU.

18 Claims, 9 Drawing Sheets

(56) References Cited

U.S. PATENT DOCUMENTS

| | | | |
|---|---|---|---|
| 2007/0230454 A1* | 10/2007 | Ginzburg | H04L 69/18 370/389 |
| 2012/0182886 A1* | 7/2012 | Ong | H04W 74/0816 370/252 |
| 2013/0107872 A1* | 5/2013 | Lovett | H04L 49/10 370/352 |

* cited by examiner

DATA TRANSMISSION METHOD AND APPARATUS

CROSS-REFERENCE TO RELATED APPLICATION

This application claims the priority benefit of Korean Patent Application No. 10-2013-0130459, filed on Oct. 30, 2013, in the Korean Intellectual Property Office, the disclosure of which is incorporated herein by reference.

BACKGROUND

1. Field of the Invention

The present invention relates to a method and apparatus for transmitting data based on an available channel bandwidth when a channel access is performed in a wireless local area network (WLAN) system.

2. Description of the Related Art

In a wireless local area network (WLAN), an enhanced distributed channel access (EDCA) protocol and a distributed coordination function (DCF) protocol in which a station (STA) or an access point (AP) independently accesses a channel using a carrier sense multiple access/collision avoidance (CSMA/CA) protocol may be performed in contrast to a mobile communication system.

In a WLAN to which 802.11e standards are applied, when a channel access is started to transmit a frame using an EDCA method, a frame can be transmitted on a primary channel if the primary channel is idle for an arbitration interframe space (AIFS)+a back-off counter time. In order to use a secondary channel having a bandwidth of at least 20 megahertz (MHz) which is a size of a basic bandwidth, the channel access may be performed when a corresponding channel is in an idle state for a period of time greater than or equal to a priority interframe space (PIFS) immediately preceding the expiration of the backoff counter.

In general, the channel access may be performed using a 20/defer mode or a 40/defer mode in 11n of the WLAN. In the 20/defer mode, when a 20 MHz primary channel is available, a frame transmission may be performed. When the 20 MHz primary channel is unavailable, the frame transmission may be on standby until a channel enters the idle state. When an 802.11n STA performs a 40 MHz channel access in the 40/defer mode, a primary channel may be in an idle state during the arbitration interframe space (AIFS)+a back-off count time as described above. When a secondary channel is in an idle state for a period of time greater than or equal to the PIFS immediately preceding the expiration of the backoff counter, a frame transmission may be performed using a bandwidth of 40 MHz. When the secondary channel is not in the idle state for the period of time greater than or equal to the PIFS immediately preceding the expiration of the backoff counter, and the primary channel is available, the frame transmission may not be performed using a bandwidth of 20 MHz although the 20 MHz primary channel is available, and a back-off process may be executed again until the bandwidth of 40 MHz becomes available.

In a case of a 40/20/defer mode, while a utilization rate is relatively low, one of a method of using a bandwidth of 40 MHz, a method of using a bandwidth of 20 MHz, and a method of restarting a back-off may be used based on a channel state.

SUMMARY

According to an aspect of the present invention, there is provided a data transmission apparatus including a queue management unit to manage at least one queue in which information associated with at least one buffer descriptor (BD) is stored, a scheduler to estimate information to be transmitted among information associated with at least one media access control (MAC) protocol data unit (MPDU) using at least one transmission bitmap (Tx bitmap), a data transmitter to read the estimated information from information associated with a BD indicated in the at least one Tx bitmap, and transmit the read information to a physical layer, and a physical layer management unit to generate information associated with a presentation protocol data unit (PPDU) based on the transmitted information, and transmit the generated information over the air, wherein at least one BD includes information associated with the at least one MPDU.

The data transmission apparatus may further include a channel access unit to transfer, to the scheduler, a request signal requesting data transmission based on a channel access process.

The channel access unit may determine a bandwidth available for a transmission during to a resolution time, and transmit the determined bandwidth to the scheduler.

The scheduler may transmit, to the data transmitter, a Tx bitmap designated among the at least one Tx bitmap based on the determined bandwidth.

The scheduler may determine the Tx bitmap and a transmission time (Tx time) using a data rate and a bandwidth based on information stored in the PPDU.

The Tx time may correspond to a duration of the PPDU output over the air.

The scheduler may operate a maximum length of a physical service data unit (PSDU) stored in the PPDU using the data rate and the bandwidth designated in the PPDU.

When the channel access unit acquires a channel for each access category (AC), the scheduler may prepare the PPDU based on a characteristic of each AC.

When the channel is acquired, the scheduler may estimate a current available time of a transmission opportunity (TXOP) limit time indicating a maximum available time.

According to another aspect of the present invention, there is also provided a data transmission method implemented by a data transmission apparatus including a queue management unit, a scheduler, a data transmitter, a physical layer management unit, and a channel access unit, the method including managing at least one queue in which information associated with at least one BD is stored, estimating information to be transmitted among information associated with at least one MPDU using at least one Tx bitmap, reading the estimated information from information associated with a BD indicated in the at least one Tx bitmap and transmitting the read information to a physical layer, and generating information associated with a PPDU based on the transmitted information, and transmitting the generated information over the air, wherein the at least one BD includes information associated with the at least one MPDU.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus may be changed depending on a user, the intent of an operator, or a custom. Accordingly, the terminologies must be defined based on the following overall description of this specification.

Figure 1:
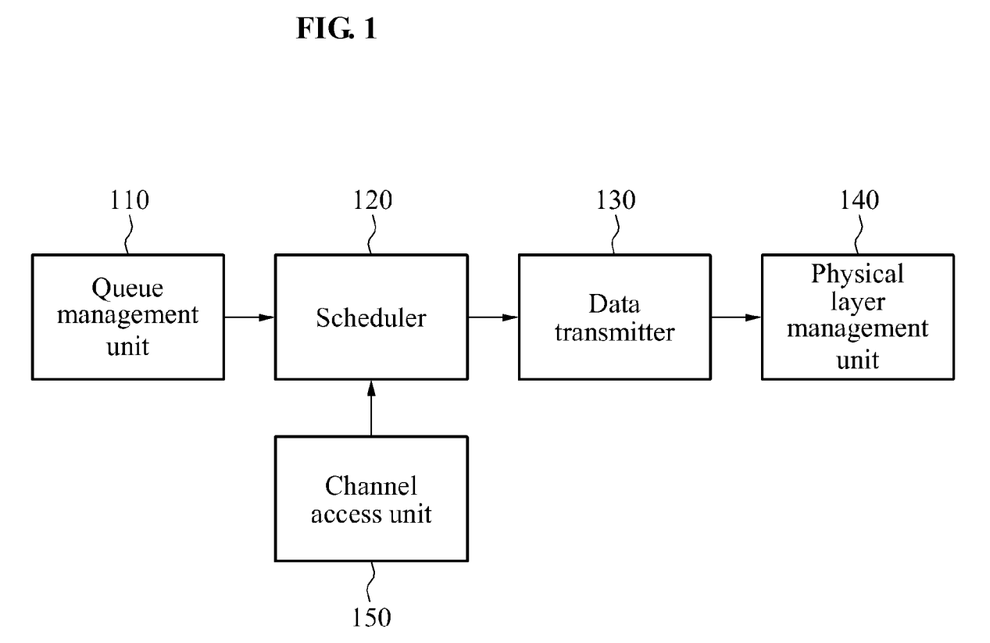
FIG. 1 is a block diagram illustrating a configuration of a data transmission apparatus according to an embodiment of the present invention.

FIG. 1 is a block diagram illustrating a configuration of a data transmission apparatus according to an embodiment of the present invention.

Referring to FIG. 1, the data transmission apparatus according to an embodiment of the present invention may include a queue management unit 110, a scheduler 120, a data transmitter 130, and a physical layer management unit 140.

Figure 2A:
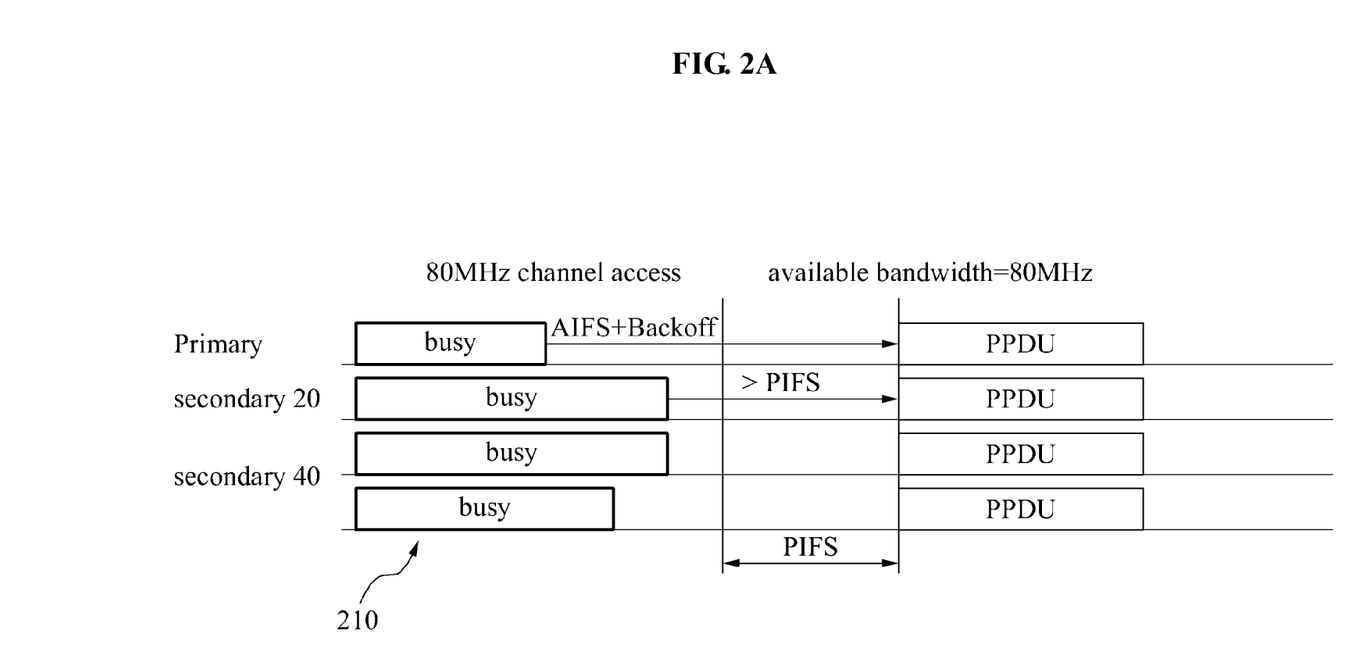
FIGS. 2A and 2B are diagrams illustrating examples of an available bandwidth based on a channel state according to an embodiment of the present invention.
Figure 2B:
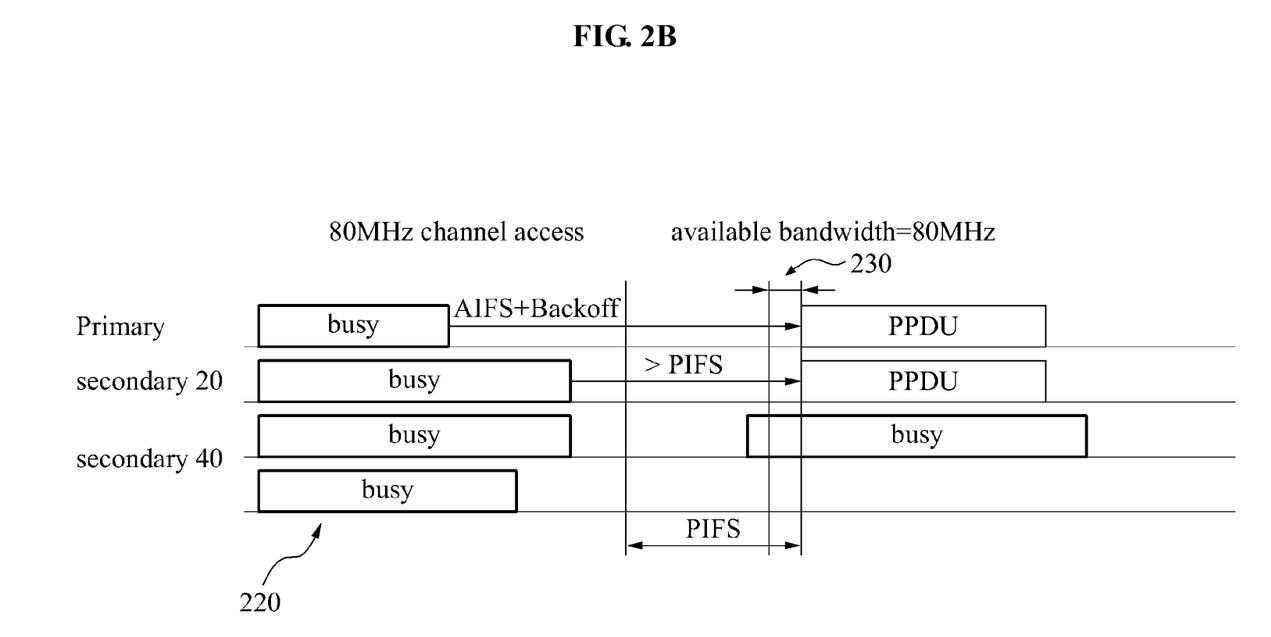

FIGS. 2A and 2B are diagrams illustrating examples of an available bandwidth based on a channel state according to an embodiment of the present invention.

In an example embodiment, since a bandwidth greater than or equal to 80 megahertz (MHz) is available in 802.11ac, an 80/defer mode may be applied when the data transmission apparatus performs a channel access to use a bandwidth of 80 MHz.

When a secondary 40 is not in an idle state during a period of time greater than or equal to a priority interframe space (PIFS) as indicated by reference numerals 210 and 220, a frame transmission may not be performed and a back-off process may be executed in the 80/defer mode. In an 80/40/defer mode, the frame transmission may be performed using a bandwidth of 40 MHz.

The data transmission apparatus may determine a channel state in advance of a minimum determination time, for example, a resolution time (T_res), during which a presentation protocol data unit (PPDU) is output over the air and transmitted to a channel using a bandwidth of 80 MHz as indicated by a reference numeral 230.

In an example embodiment, T_res may be changed based on an implementation method. The lower the T_res value, the greater quantity of data associated with a channel state reflected to a frame transmission.

For example, a bandwidth of 80 MHz available in a bandwidth of 5 gigahertz (GHz) may differ for respective nations and three to five 80 MHz channels may be used. Based on a number of access points (APs) and stations (STAs) using the bandwidth of 5 GHz, the data transmission apparatus may perform a channel access and a transmission in an 80/40/defer mode, an 80/20/defer mode, or an 80/40/20/defer mode.

In order to determine a bandwidth available for the channel access, the data transmission apparatus may determine the available bandwidth in advance of the T_res as indicated by the reference numeral 230, and process the T_res to have a relatively small value, thereby improving efficiency in a system.

Referring back to FIG. 1, the queue management unit 110 may manage at least one queue in which information associated with at least one buffer descriptor (BD) is stored. In this instance, the at least one BD may include information associated with at least one media access control (MAC) protocol data unit (MPDU).

A plurality of BDs may be stored in the queue managed by the queue management unit 110, and each of the plurality of BDs may include control information associated with the MPDU.

Figure 3:
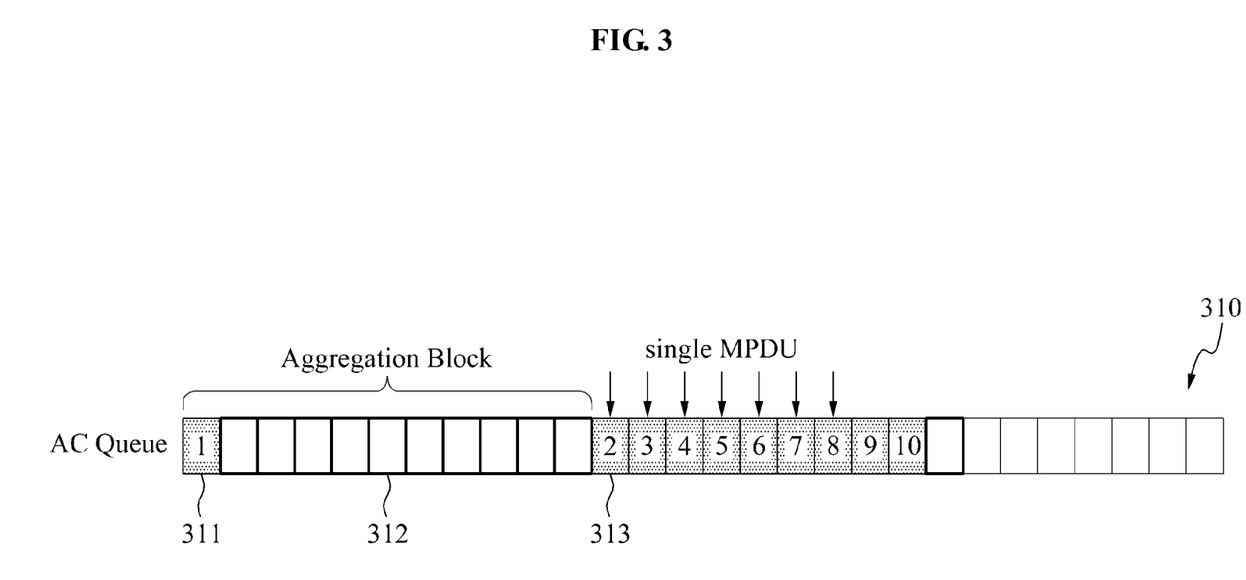
FIG. 3 is a diagram illustrating an example of information associated with a buffer descriptor (BD) stored in a queue according to an embodiment of the present invention.

FIG. 3 is a diagram illustrating an example of information associated with a BD stored in a queue according to an embodiment of the present invention.

Referring to FIG. 3, a BD 311 may be a foremost portion of the queue. MPDUs included in an aggregation block including the BD 311 may be generated into an aggregated MAC protocol data unit (AMPDU). Each BD may include an aggregation flag indicating whether participation in an aggregation is determined, and a PPDU flag indicating a starting point of a PPDU, in addition to control information associated with an MPDU frame.

In a BD 313, the aggregation flag may be set to be "0", and the PPDU flag may be set to be "1" such that each MPDU is configured to be an independent PPDU. In the BD 311, the aggregation flag may be set to be "1", and the PPDU flag may be set to be "1" so as to indicate a starting point of the aggregation block.

In a BD 312, the PPDU flag may be set to be "0", and the aggregation flag may be set to be "1" so as to indicate that the MPDU is included in the aggregation block. Information included in each BD may include information associated with a bandwidth, a data rate, a size and a location of the MPDU stored in a memory, and the like. A PPDU BD may refer to a BD in which the PPDU flag is set to be "1", among the BDs stored in the queue. The PPDU BD may include information used for generating the PPDU.

Figure 4:
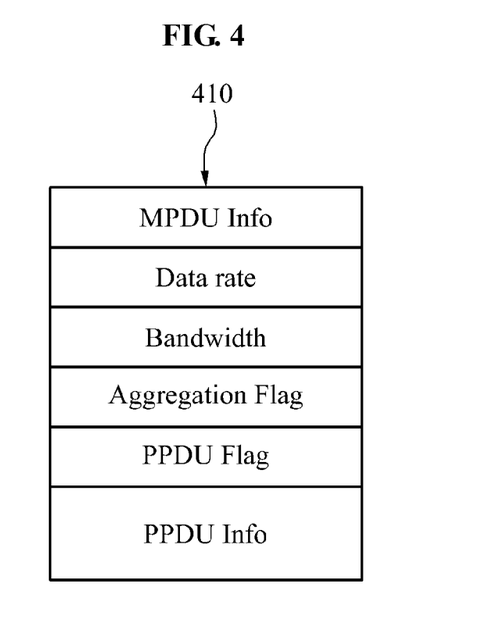
FIG. 4 is a diagram illustrating an example of information included in a BD.

FIG. 4 is a diagram illustrating an example of information included in a BD 410.

Referring to FIG. 4, the BD 410 may include MPDU information, for example, MPDU info indicating a location in which an MPDU is stored, a PPDU flag, an aggregation flag, a bandwidth, a data rate used for a transmission performed in a physical layer, and PPDU information, for example, PPDU info used for generating a PPDU in the physical layer.

Referring back to FIG. 1, the scheduler 120 may estimate information to be transmitted, among information associated with the at least one MPDU using the at least one transmission bitmap (Tx bitmap).

Figure 5:
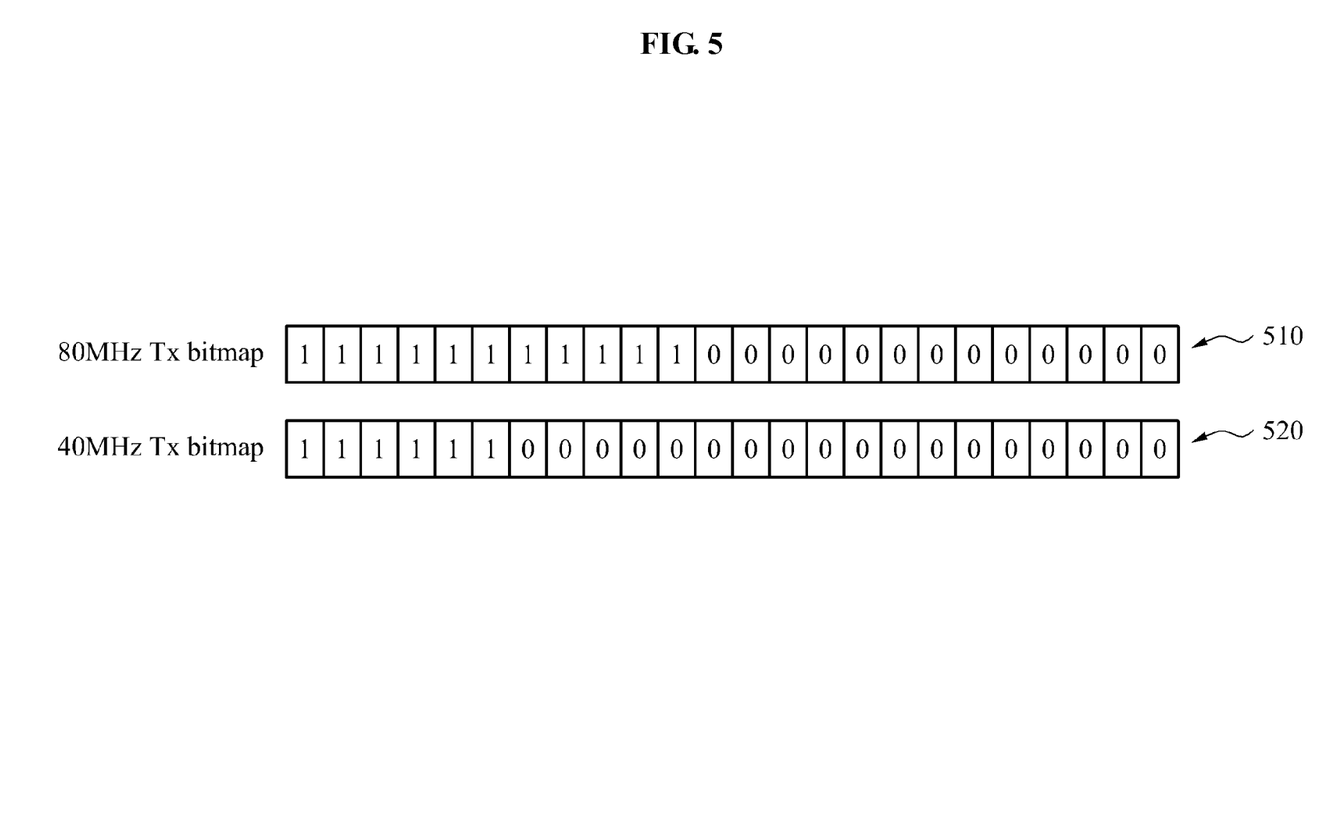
FIG. 5 is a diagram illustrating an example of a transmission bitmap (Tx bitmap) according to an embodiment of the present invention.

FIG. 5 is a diagram illustrating an example of a Tx bitmap according to an embodiment of the present invention.

Referring to FIGS. 1 and 5, the scheduler 120 may provide, to the data transmitter 130, a notification indicating that MPDUs corresponding to a predetermined BD among BDs currently included in a queue are supposed to be transmitted, using Tx bitmaps including an 80 MHz Tx bitmap 510 and a 40 MHz Tx bitmap 520.

The data transmitter 130 may read MPDU information estimated based on BD information indicated in at least one Tx bitmap, and transmit the read MPDU information to a physical layer.

The data transmitter 130 may read information associated with the MPDU information from the BD information indicated in the Tx bitmap, and transmit the read information to a physical layer.

The physical layer management unit 140 may generate PPDU information based on the MPDU information transmitted to the physical layer, and transmit the generated PPDU information in an air.

The physical layer management unit 140 may generate a PPDU using MPDUs transmitted by the data transmitter 130 and the PPDU information included in the BD, and transmit the generated PPDU over the air.

A data transmission apparatus according to an embodiment of the present invention may also include the channel access unit 150. The channel access unit 150 may transfer, to the scheduler 120, a request signal requesting a data transmission, during a resolution time based on a channel access process. For example, the channel access unit 150 may transmit, to the scheduler 120, a signal requesting a transmission, during T_res of FIG. 2 based on the channel access process.

The channel access unit 150 may determine a bandwidth available for transmission in the resolution time, and transmit the determined bandwidth to the scheduler 120.

The scheduler 120 may determine a Tx bitmap and a transmission time (Tx time) using the data rate and the bandwidth based on information stored in the PPDU. The scheduler 120 may transmit, to the data transmitter 130, a Tx bitmap designated among at least one Tx bitmap using the determined bandwidth. Here, the Tx time may correspond to a duration of the PPDU output over the air.

For example, the scheduler 120 may determine the Tx bitmap and the Tx time in advance using the data rate and the bandwidth based on the information included in the BD of the PPDU, and have the determined Tx bitmap and Tx time. As described in FIG. 5, when a bandwidth of 80 MHz is designated in the PPDU of the BD, the scheduler 120 may configure the Tx bitmap with respect to a bandwidth less than or equal to 80 MHz.

When an 80 MHz transmission is available, a Tx bitmap may be expressed as the 80 MHz Tx bitmap 510. When a 40 MHz transmission is available, a Tx bitmap may be expressed as the 40 MHz Tx bitmap 520.

Figure 6:
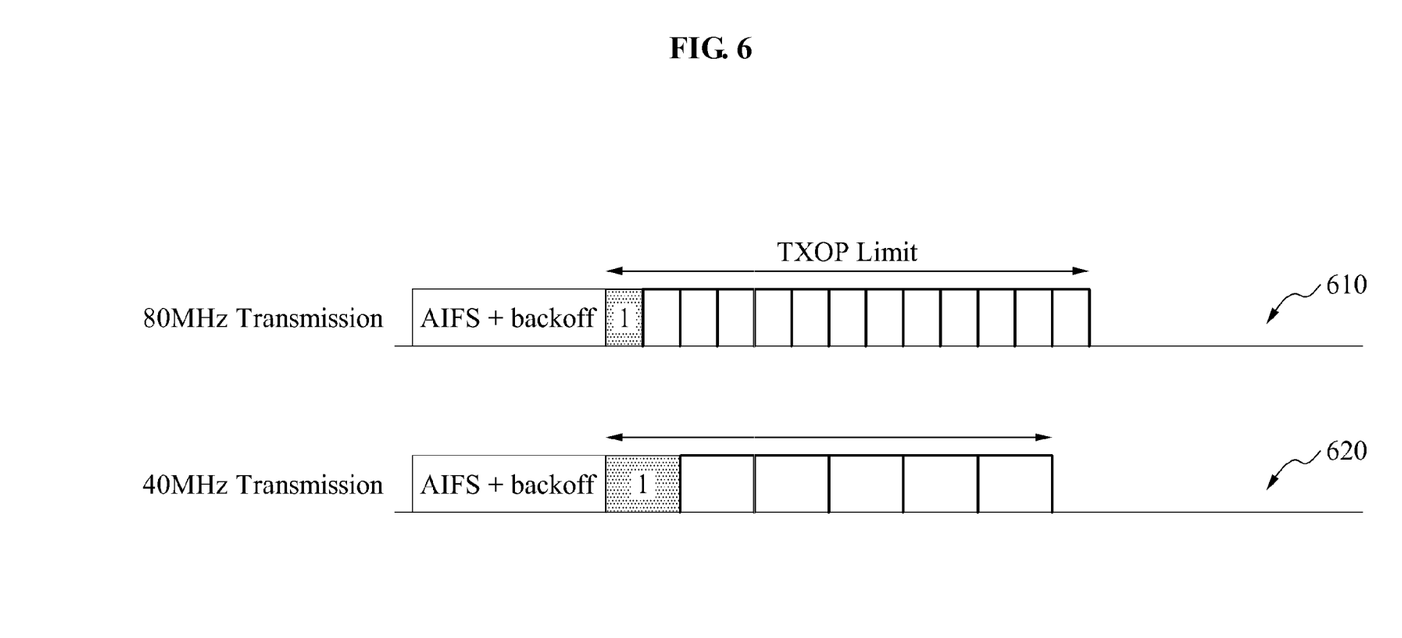
FIG. 6 is a diagram illustrating an example of a transmission rate according to an embodiment of the present invention.

FIG. 6 is a diagram illustrating an example of a transmission rate according to an embodiment of the present invention.

Referring to FIG. 6, since a transmission rate of a Tx bitmap may be changed based on a size of a bandwidth, a Tx time of a PPDU indicated over the air for use in an 80 MHz transmission 610 may differ from that of a 40 MHz transmission 620.

Referring back to FIG. 1, the channel access unit 150 may perform a channel access based on a process defined in a wireless local area network (WLAN) standard, and determine a bandwidth available for transmission during T_res of FIG. 2.

When the channel access unit 150 transmits a signal requesting a transmission, the channel access unit 150 may also transmit an available bandwidth to the scheduler 120. The scheduler 120 may verify the available bandwidth based on a designated bandwidth, and transmit, to the data transmitter 130, a Tx bitmap designated among Tx bitmaps prepared in advance.

The scheduler 120 may configure the PPDU using each MPDU, and perform a process for determining the Tx bitmap, as described in the following.

When the scheduler 120 acquires a channel for each access category (AC) using the channel access unit 150, the scheduler 120 may prepare the PPDU based on a characteristic of each AC. When the channel access unit 150 acquires the channel for each AC, a condition for preparing the PPDU by the scheduler 120 based on the characteristic of each AC may be changed.

When the channel is acquired, the scheduler 120 may estimate a current available time of a transmission opportunity (TXOP) limit time, indicating a maximum available time.

For example, when the TXOP limit time is "0", a single MPDU or a single AMPDU may be transmitted in general, and a size of the MPDU or a size of the AMPDU may be restricted based on a maximum time of the PPDU. When the TXOP limit time is not "0", the scheduler 120 may transmit a plurality of MPDUs or a plurality of AMPDUs during a designated time.

When the TXOP limit time is not "0", the scheduler 120 may determine a number of aggregations based on a method described below while preparing the PPDU for transmission.

For example, the number of aggregations may be "64", and a Tx time of the duration of the PPDU may be set based on the TXOP limit time and a reception time of a block ACK (BA) as shown in Equation 1.

$$\text{Available Tx TIME} = T_{TXOP\_Limit} - (T_{SIFS} + T_{BA}) \qquad \text{[Equation 1]}$$

In Equation 1, $T_{TXOP\_Limit}$ denotes the TXOP limit time, $T_{SIFS}$ denotes a short interframe space (SIFX) time, and $T_{BA}$ denotes a BA time.

When the data transmission apparatus transmits a request to send and clear to send (RTS/CTS) in order to transmit the MPDU or the AMPDU, the data transmission apparatus may operate the Tx time based on the RTS/CTS as shown in Equation 2.

$$\text{Available Tx TIME} = T_{TXOP\_Limit} - (T_{RTS} + T_{SIFS} + T_{CTS} + T_{SIFS} + T_{SIFS} + T_{BA}) \qquad \text{[Equation 2]}$$

In Equation 2, $T_{CTS}$ denotes a CTS time.

Also, when a CTS-to-Self is set for a transmission BD, the data transmission apparatus may operate the Tx time as shown in Equation 3.

$$\text{Available Tx TIME} = T_{TXOP\_Limit} - (T_{CTS\text{-}to\text{-}Self} + T_{SIFS} + T_{SIFS} + T_{BA}) \qquad \text{[Equation 3]}$$

In equation 3, $T_{CTS\text{-}to\text{-}Self}$ denotes a CTS-to-Self time.

The scheduler 120 may obtain an available Tx time of the TXOP limit time using Equation 1, Equation 2, and Equation 3 based on each condition.

The scheduler 120 may operate a maximum length of a physical service data unit (PSDU), for example, a max PSDU length stored in the PPDU using the bandwidth and the data rate designated in the PPDU. For example, the scheduler 120 may obtain the maximum length of the PSDU possible to be stored in the PPDU using the bandwidth and the data rate designated in the PPDU of the BD based on each predetermined PPDU format.

In this instance, various values may be applied to the bandwidth based on a channel access operation mode. For example, in an 80/40/defer mode, a value of the maximum length of the PSDU for 80 MHz transmission and a value of the maximum length of the PSDU for 40 MHz transmission may be obtained.

Figure 7:
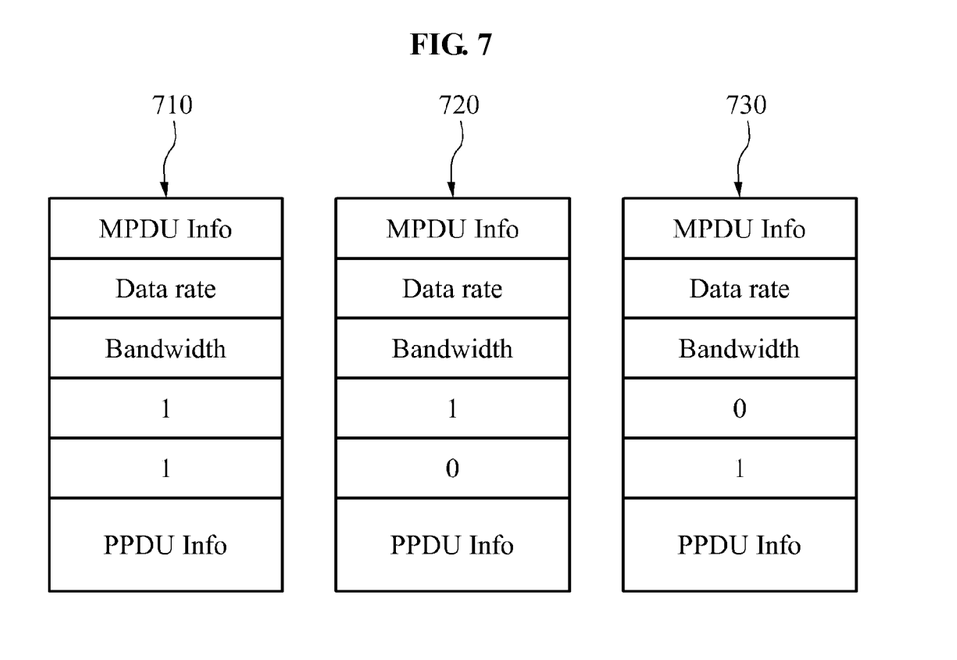
FIG. 7 is a diagram illustrating successive BDs according to an embodiment of the present invention.

FIG. 7 is a diagram illustrating successive BDs according to an embodiment of the present invention.

Referring to FIG. 7, a data transmission apparatus may successively read the BDs through operations 710 through 730, and may perform calculation on an accumulated aggregation size. The data transmission apparatus may set a bit of a corresponding MPDU to be "1" in a Tx bitmap until the accumulated size of aggregation becomes less than a maximum length of the PSDU. Through the aforementioned operations, the data transmission apparatus may generate two Tx bitmaps as indicated by the 80 MHz Tx bitmap 510 and the 40 MHz Tx bitmap 520 of FIG. 5.

The scheduler 120 may generate the Tx bitmap by reading the BD of the queue for each bandwidth. When the Tx bitmap is generated, the scheduler 120 may operate a Tx time of the PPDU and provide, to the channel access unit 150, a notification indicating that the PPDU is generated for an 80 MHz channel and a 40 MHz channel.

The channel access unit 150 may determine the bandwidth based on an enhanced distributed channel access (EDCA) process, and request a transmission, to the scheduler 120.

The scheduler 120 may prepare another PPDU during a remaining time of an available Tx time, aside from the Tx time of the transmitted PPDU.

The scheduler 120 may update Tx times of a subsequent MPDU and a subsequent PPDU BD standing by in the queue based on the determined bandwidth, and prepare a subsequent PPDU. The scheduler 120 may repetitively prepare the PPDU based on a bandwidth less than or equal to the determined bandwidth while a TXOP is being processed.

Hereinafter, description about a data transmission method according to an embodiment of the present invention will be provided.

The data transmission method according to an embodiment of the present invention may be implemented by the aforementioned data transmission apparatus and thus, repeated descriptions will be omitted for increased clarity and conciseness.

Figure 8:
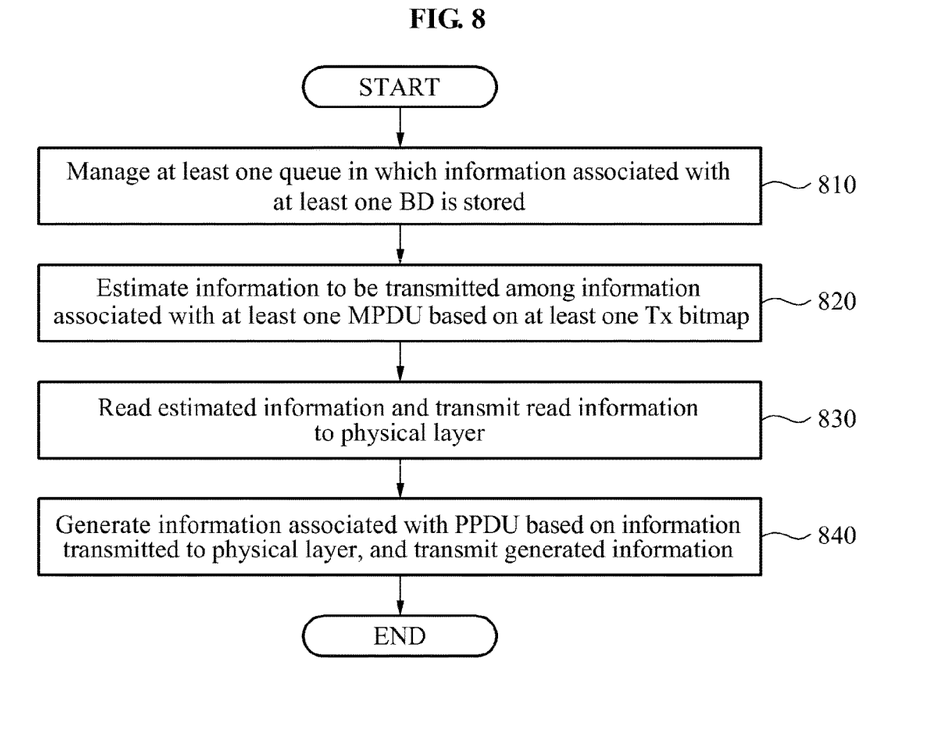
FIG. 8 is a flowchart illustrating a data transmission method according to an embodiment of the present invention.

FIG. 8 is a flowchart illustrating a data transmission method according to an embodiment of the present invention.

Referring to FIG. 8, in operation 810, a queue management unit may manage at least one queue in which information associated with at least one BD is stored.

In operation 820, a scheduler may estimate information to be transmitted among information associated with at least one MPDU based on at least one Tx bitmap.

In operation 830, a data transmitter may read the MPDU information estimated based on the BD information indicated in the at least one Tx bitmap, and transmit the read MPDU information to a physical layer.

In operation 840, a physical layer management unit may generate PPDU information based on the MPDU information transmitted to the physical layer, and transmit the generated PPDU information over the air.

According to an aspect of the present invention, it is possible to transmit data using an available bandwidth when a channel access is performed using a channel access method in a wireless communication system.

According to another aspect of the present invention, it is possible to prepare a frame based on a channel state in a scheduler block in which data is prepared and transmitted when an operation is performed in another operation mode different from an 80/defer mode, and the frame is transmitted using a bandwidth having a relatively large size.

According to still another aspect of the present invention, it is possible to transmit a PPDU using a maximum available bandwidth without abandoning use of a channel.

In a data transmission method according to an embodiment of the present invention, a frame may be prepared based on a state of a channel in a scheduler block in which data is prepared and transmitted when an operation is performed in other operation mode, aside from an 80/defer mode, and the frame is transmitted using a bandwidth having a relatively large size, and a PPDU may be transmitted using a maximum available bandwidth without abandoning use of a channel.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A data transmission apparatus comprising:
   a queue management unit to manage, using a processor, at least one queue in which information associated with at least one buffer descriptor (BD) is stored;
   a scheduler to estimate information to be transmitted among information associated with at least one media access control (MAC) protocol data unit (MPDU) using at least one transmission bitmap (Tx bitmap), to obtain a maximum length of a physical service data unit (PSDU) to be stored in a presentation protocol data unit (PPDU), and to set an aggregation flag until a size of aggregation becomes less than the maximum length of the PSDU, using a processor;
   a data transmitter to read the estimated information from information associated with a BD indicated in the at least one Tx bitmap, and transmit the read information to a physical layer, using a processor; and a physical layer management unit to generate information associated with PPDU based on the transmitted information, and transmit the generated information over the air, using a processor, wherein the at least one BD includes information associated with the at least one MPDU and the aggregation flag for a transmission performed in a physical layer.

2. The apparatus of claim 1, further comprising:
a channel access unit to transfer, to the scheduler, a request signal requesting data transmission based on a channel access process, using a processor.

3. The apparatus of claim 1, wherein the channel access unit determines a bandwidth available for a transmission during to a resolution time, and transmits the determined bandwidth to the scheduler.

4. The apparatus of claim 3, wherein the scheduler transmits, to the data transmitter, a Tx bitmap designated among the at least one Tx bitmap based on the determined bandwidth.

5. The apparatus of claim 1, wherein the scheduler determines the Tx bitmap and a transmission time (Tx time) using a data rate and a bandwidth based on information stored in the PPDU.

6. The apparatus of claim 5, wherein the Tx time corresponds to a duration of the PPDU output over the air.

7. The apparatus of claim 5, wherein the scheduler operates a maximum length of a physical service data unit (PSDU) stored in the PPDU using the data rate and the bandwidth designated in the PPDU.

8. The apparatus of claim 2, wherein when the channel access unit acquires a channel for each access category (AC), the scheduler prepares the PPDU based on a characteristic of each AC.

9. The apparatus of claim 8, wherein when the channel is acquired, the scheduler estimates a current available time of a transmission opportunity (TXOP) limit time indicating a maximum available time.

10. A data transmission method implemented by a data transmission apparatus comprising a queue management unit, a scheduler, a data transmitter, a physical layer management unit, and a channel access unit, the method comprising:

managing at least one queue in which information associated with at least one buffer descriptor (BD) is stored;

estimating information to be transmitted among information associated with at least one MAC protocol data unit (MPDU) using at least one transmission bitmap (Tx bitmap);

obtaining a maximum length of a physical service data unit (PSDU) to be stored in a presentation protocol data unit (PPDU) and setting an aggregation flag until a size of aggregation becomes less than the maximum length of the PSDU;

reading the estimated information from information associated with a BD indicated in the at least one Tx bitmap and transmitting the read information to a physical layer; and generating information associated with the PPDU based on the transmitted information, and transmitting the generated information over the air, wherein the at least one BD includes information associated with the at least one MPDU and the aggregation flag for a transmission performed in a physical layer.

11. The method of claim 10, further comprising:
transferring, to the scheduler, a request signal requesting a data transmission based on a channel access process.

12. The method of claim 11, further comprising:
determining, by the channel access unit, a bandwidth available for transmission during a resolution time, and transmitting the determined bandwidth to the scheduler.

13. The method of claim 12, further comprising:
transmitting, by the scheduler, a Tx bitmap designated among the at least one Tx bitmap, to the data transmitter based on the determined bandwidth.

14. The method of claim 10, further comprising:
determining, by the scheduler, the Tx bitmap and a transmission time (Tx time) using a data rate and a bandwidth based on information stored in the PPDU.

15. The method of claim 14, wherein the TX time corresponds to a duration of the PPDU output over the air.

16. The method of claim 14, further comprising:
operating, by the scheduler, a maximum length of a physical service data unit (PSDU) stored in the PPDU using the data rate and the bandwidth designated in the PPDU.

17. The method of claim 11, further comprising:
preparing, by the scheduler, the PPDU based on a characteristic of each access category (AC) when the channel access unit acquires a channel for each AC.

18. The method of claim 17, further comprising:
estimating, by the scheduler, a current available time of a transmission opportunity (TXOP) limit time indicating a maximum available time when the channel is acquired.

* * * * *